V. E. KEEGAN.
Galvanic Battery.
No. 163,318.
Patented May 18, 1875.
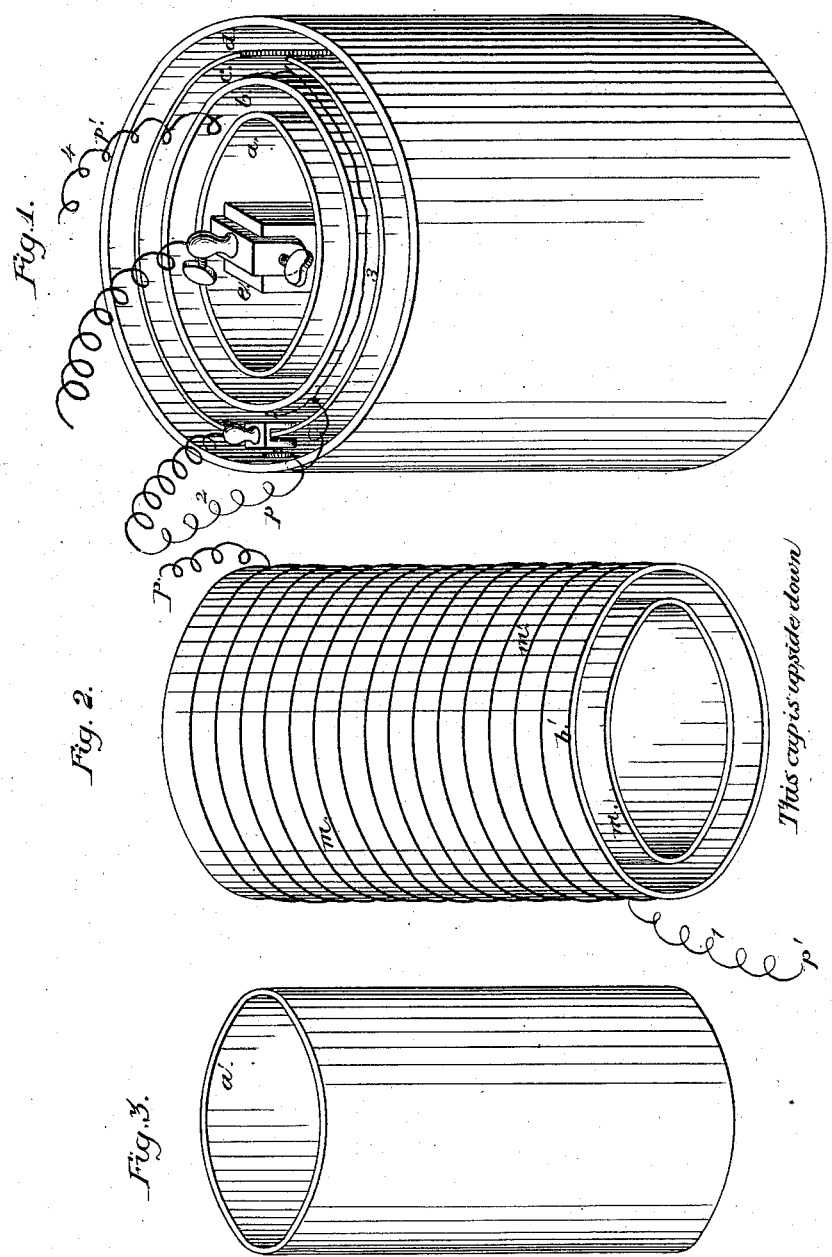
Witnesses:
A. J. Keegan
A. M. Keegan
Inventor:
Vincent E. Keegan

UNITED STATES PATENT OFFICE.

VINCENT E. KEEGAN, OF BOSTON, MASSACHUSETTS.

IMPROVEMENT IN GALVANIC BATTERIES.

Specification forming part of Letters Patent No. 163,318, dated May 18, 1875; application filed February 4, 1875.

*To all whom it may concern:*

Be it known that I, VINCENT E. KEEGAN, of Boston, in the county of Suffolk, State of Massachusetts, have invented a new and Improved form of Galvanic Battery; and I do hereby declare that the following is a full and exact description thereof.

The nature of my invention consists in an improvement in galvanic batteries by the peculiar arrangement of its several parts, and causing the exciting fluids to produce a purely electro-chemical action without any pure chemical action.

To enable others skilled in the art to make and use my invention, I will proceed to describe its construction and action.

I place within a glass or earthenware vessel, $d$, containing pure water, a cylinder of metal, $e$, and within this metal cylinder I place a porous earthenware cell or cup, $b$, and within this another porous cell, $a$, of about four-fifths the diameter of $b$. I fill the central cell $a$ with nitric acid, and the space in the large cell $b$, intervening between it and the cell $a$, with oil of vitriol. A carbon pole, E, is placed in cell $a$, and connected by a conducting-wire with the connecting-wire of the zinc pole. An electric current is immediately established.

The nitric acid in cell $a$ is negative to the oil of vitriol in cell $b$, and the vitriol is positive to the water and zinc. The fluid in cell $a$ determines a positive electric current, with dilute sulphuric acid to pass from the bottom of cell $b$ by osmosis to the zinc, and a negative current with the hydrogen passes from the zinc into the cell $b$ containing the oil of vitriol, through its sides, where the hydrogen is absorbed. As the oil of vitriol in cell $b$ is positive to the nitric acid in cell $a$ it flows into it, by osmosis, with the current, and gives up its absorbed hydrogen, thereby completing the electric circuit between the zinc and nitric acid containing the carbon pole, and producing a purely electro-chemical action.

As there is no acid in the water surrounding the zinc, except that contained in the positive current, there is no possibility of a purely chemical action.

Around the outside and bottom of the large porous cell $b$ I coil a copper wire, $m\ m'\ m''$, or its equivalent, an extension of metallic communication, which would be a metallic jacket, perforated with holes, or a wire-gauze, on a metallic surrounding of any kind, suitable for conducting electricity in the manner of said coil, with two polar ends, and connect one of its terminal ends, $p$, with the connecting-wire of the zinc pole, and the other end $p$ will then be the terminal end of the connecting conducting-wire of the zinc pole. By reason of the current in this wire coil or metallic conductor, when the battery is acting, the occlusion of hydrogen gas and the metallic salts within the walls of the porous cell, formed by the decomposition of the metallic plate, is prevented, and thereby allowing the free transmission of sulphuric acid in one direction, and of hydrogen gas in another direction. A constancy of action is thus produced in the porous cell for the free transmission of electricity and the elements.

I do not limit myself to the use of strong nitric acid or oil of vitriol in the porous cells. Either or both may be diluted. A dilution containing thirty per cent. of acid is a good conducting fluid, but the strong acid is more advisable. Neither do I limit myself to these particular acids, as other acids or acids and salts may be used with effect in the porous cells $a\ b$, providing they have like relative electric conditions to each other and the zinc; or a metal rod may be placed in cell $a$, with water in substitution for acid, but with less satisfactory results.

What I claim, and desire to secure by Letters Patent as an improvement in galvanic batteries, is—

1. The arrangement of a porous cell, $a$, placed within another porous cell, $b$, which shall allow of a space between them to constitute a vessel, and each cell to contain an acid or a salt, which shall be electrically or chemically different in each cell, to act electively with each other and to the negative metal of the battery, in the manner substantially as described.

2. In combination with the porous cell $b$, a coil of wire, $m\ m'\ m''$, through which the electric current circulates, said wire surrounding the porous cell, and consisting of a continuation of the wire leading from the zinc pole of the battery.

VINCENT E. KEEGAN.

Witnesses:
A. T. KEEGAN,
A. M. KEEGAN.